United States Patent
Kim et al.

(10) Patent No.: US 9,131,215 B2
(45) Date of Patent: Sep. 8, 2015

(54) METHOD AND APPARATUS FOR TRANSMITTING AND RECEIVING UNCOMPRESSED THREE-DIMENSIONAL VIDEO DATA VIA DIGITAL DATA INTERFACE

(75) Inventors: Jae-seung Kim, Yongin-si (KR); Jae-jun Lee, Suwon-si (KR); Se-huhn Hur, Yongin-si (KR); Houng-sog Min, Ansan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 589 days.

(21) Appl. No.: 12/893,345

(22) Filed: Sep. 29, 2010

(65) Prior Publication Data

US 2011/0080465 A1 Apr. 7, 2011

Related U.S. Application Data

(60) Provisional application No. 61/246,598, filed on Sep. 29, 2009.

(30) Foreign Application Priority Data

Dec. 28, 2009 (KR) ........................ 10-2009-0131834

(51) Int. Cl.
*H04N 13/00* (2006.01)
*H04N 7/083* (2006.01)
*H04N 7/088* (2006.01)

(52) U.S. Cl.
CPC ........... *H04N 13/0048* (2013.01); *H04N 7/083* (2013.01); *H04N 7/088* (2013.01); *H04N 13/0059* (2013.01); *H04N 13/0066* (2013.01)

(58) Field of Classification Search
CPC ... H04N 7/083; H04N 7/088; H04N 13/0066; H04N 13/0059; H04N 13/0048
See application file for complete search history.

(56) References Cited

U.S. PATENT DOCUMENTS

2007/0296859 A1* 12/2007 Suzuki ........................ 348/473
2010/0182402 A1*  7/2010 Nakajima et al. ............. 348/42
2010/0225645 A1*  9/2010 Suh et al. ..................... 345/419

* cited by examiner

*Primary Examiner* — Behrooz Senfi
*Assistant Examiner* — Maria Vazquez Colon
(74) *Attorney, Agent, or Firm* — Sughrue Mion, PLLC

(57) ABSTRACT

A method and apparatus for transmitting and receiving video data via a digital data interface are provided. The video data transmission method includes: inserting three-dimensional (3D) video data into a video data period in a video frame; inserting information regarding a 3D image format of the 3D video data into a data island period in the video frame; and transmitting the video frame via the digital data interface.

26 Claims, 8 Drawing Sheets

FIG. 3
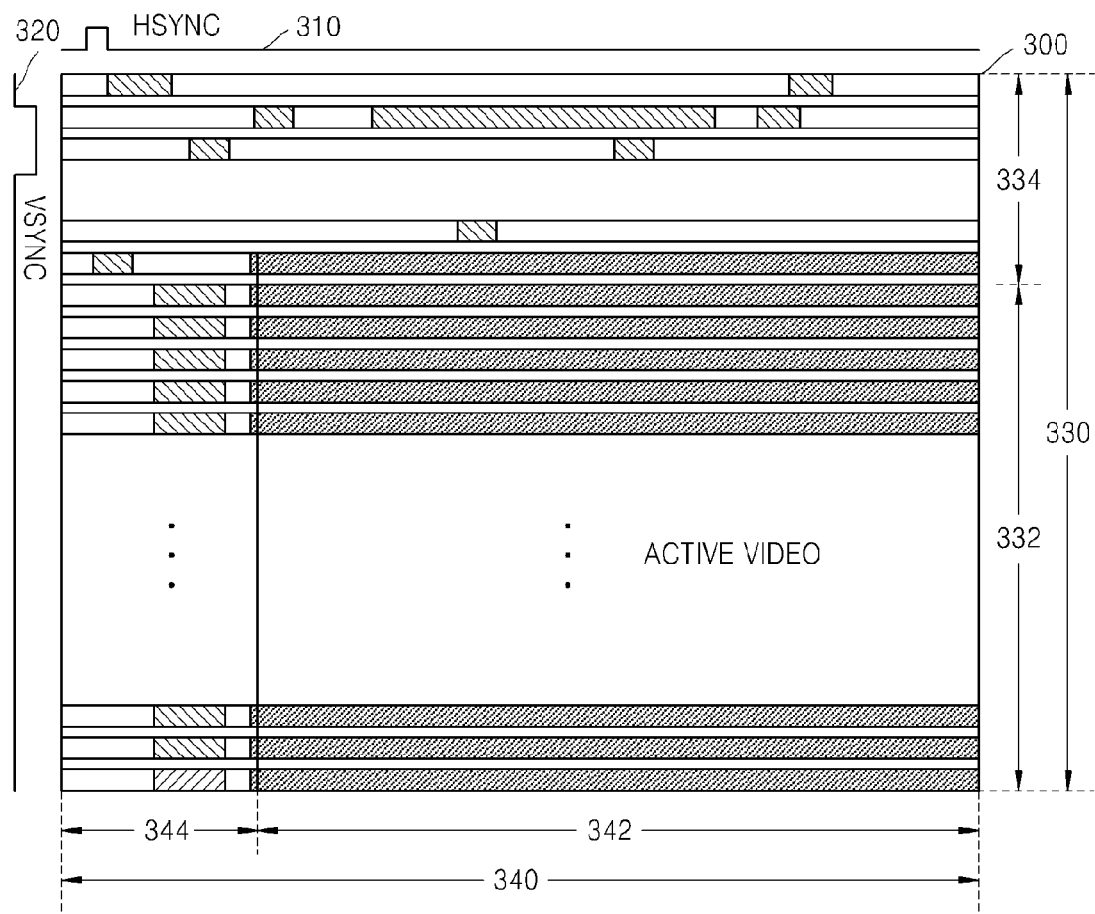
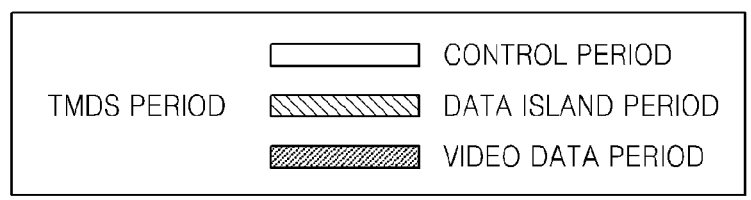

| BYTE/BIT # | 7 | 6 | 5 | 4 | 3 | 2 | 1 | 0 |
|---|---|---|---|---|---|---|---|---|
| HB0 | PACKET TYPE |||||||||
| HB1 | PACKET-SPECIFIC DATA |||||||||
| HB2 | PACKET-SPECIFIC DATA |||||||||

FIG. 5

| PACKET TYPE VALUE | PACKET TYPE |
|---|---|
| 0x00 | NULL |
| 0x01 | AUDIO CLOCK REGENERATION (N/CTS) |
| 0x02 | AUDIO SAMPLE (L-PCM AND IEC 61937 COMPRESSED FOMRATS) |
| 0x03 | GENERAL CONTROL |
| 0x04 | ACP PACKET |
| 0x05 | ISRC1 PACKET |
| 0x06 | ISRC2 PACKET |
| 0x07 | ONE BIT AUDIO SAMPLE PACKET |
| 0x08 | DST AUDIO PACKET |
| 0x09 | HIGH BITRATE (HBR) AUDIO STREAM PACKET (IEC 61937) |
| 0x0A | GAMUT METADATA PACKET |
| 0x80 + INFOFRAME TYPE | INFOFRAME PACKET |
| 0x81 | VENDOR-SPECIFIC INFOFRAME —— 510 |
| 0x82 | AVI INFOFRAME |
| 0x83 | SOURCE PRODUCT DESCRIPTOR INFOFRAME |
| 0x84 | AUDIO INFOFRAME |
| 0x85 | MPEG SOURCE INFOFRAME |

FIG. 7

| VALUE | MEANING | |
|---|---|---|
| 000 | NO ADDITIONAL VIDEO FORMAT | 700 |
| 010 | 3D FORMAT INDICATION | |

FIG. 8

| VALUE | MEANING | |
|---|---|---|
| 0000~1000 | | 800 |
| 1001 | TOP – BOTTOM (HALF) | |
| 1010~1111 | RESERVED | |

| 3D_EXT_DATA | MEANING | |
|---|---|---|
| 0000~0111 | | |
| 1000 | | ODD/LEFT PICTURE, ODD/RIGHT PICTURE |
| 1001 | VERTICAL LINE SUB-SAMPLING | ODD/LEFT PICTURE, EVEN/RIGHT PICTURE |
| 1010 | | EVEN/LEFT PICTURE, ODD/RIGHT PICTURE |
| 1011 | | EVEN/LEFT PICTURE, EVEN/RIGHT PICTURE |
| 1100~1111 | RESERVED | |

METHOD AND APPARATUS FOR TRANSMITTING AND RECEIVING UNCOMPRESSED THREE-DIMENSIONAL VIDEO DATA VIA DIGITAL DATA INTERFACE

CROSS-REFERENCE TO RELATED PATENT APPLICATIONS

This application claims priority from U.S. Provisional Patent Application No. 61/246,598, filed on Sep. 29, 2009 in the U.S. Patent and Trademark Office, and Korean Patent Application No. 10-2009-0131834, filed on Dec. 28, 2009 in the Korean Intellectual Property Office, the disclosures of which are incorporated herein in their entireties by reference.

BACKGROUND

1. Field

Apparatuses and methods consistent with exemplary embodiments relate to transmission and reception of video data via a digital data interface.

2. Description of the Related Art

As three-dimensional (3D) video data display and communication technologies are developed, a technology for providing a 3D video service is being actively researched. A 3D video service may be provided by alternately and rapidly outputting left-view and right-view images to a user and, thus, allowing the user to visually experience a 3D effect.

However, since 3D video data is based on a 3D effect caused by an optical illusion, if the 3D video data is not accurately reproduced, a user may experience visual fatigue. Accordingly, for a high-quality 3D video service, left-view and right-view images of 3D video data have to be accurately restored and reproduced.

SUMMARY

Exemplary embodiments provide a method of transmitting and receiving three-dimensional (3D) video data, information regarding a 3D video format, and its related information via a digital data interface, and an apparatus for performing the method and including a digital data interface.

According to an aspect of an exemplary embodiment, there is provided a method of transmitting video data via a digital data interface, the method including: inserting three-dimensional (3D) video data into a video data period in a video frame; inserting information regarding a 3D image format of the 3D video data into a data island period in the video frame; and transmitting the video frame via the digital data interface.

The 3D image format of the 3D video data may include a top-and-bottom format.

The inserting the information regarding the 3D image format may include inserting at least one of the information regarding the 3D image format, information regarding a sub-sampling method for the top-and-bottom format, and information representing whether the information regarding the 3D image format is inserted into the data island period, into a vendor-specific infoframe in the data island period.

Information regarding the top-and-bottom format may be inserted into a reserved period of a 3D video data field in the vendor-specific infoframe, and the information regarding the sub-sampling method for the top-and-bottom format may be inserted into a reserved period of an extended 3D video data field in the vendor-specific infoframe.

The sub-sampling method for the top-and-bottom format may be one of: a first sub-sampling method of respectively aligning left-view data formed of odd-numbered horizontal lines of a left-view image of the 3D video data and right-view data formed of odd-numbered horizontal lines of a right-view image of the 3D video data, in top and bottom regions of a 3D image in the top-and-bottom format; a second sub-sampling method of respectively aligning left-view data formed of odd-numbered horizontal lines of a left-view image of the 3D video data and right-view data formed of even-numbered horizontal lines of a right-view image of the 3D video data, in top and bottom regions of a 3D image in the top-and-bottom format; a third sub-sampling method of respectively aligning left-view data formed of even-numbered horizontal lines of a left-view image of the 3D video data and right-view data formed of odd-numbered horizontal lines of a right-view image of the 3D video data, in top and bottom regions of a 3D image in the top-and-bottom format; and a fourth sub-sampling method of respectively aligning left-view data formed of even-numbered horizontal lines of a left-view image of the 3D video data and right-view data formed of even-numbered horizontal lines of a right-view image of the 3D video data, in top and bottom regions of a 3D image in the top-and-bottom format.

The method may further include inserting audio data and auxiliary data of the 3D video data into the data island period in the video frame, and the video frame may be the digital data to be transmitted from a source device to a synchronization device, may be a transition minimized differential signaling (TMDS)-based signal, and may include a control period between the video data period and the data island period.

According to an aspect of another exemplary embodiment, there is provided a method of receiving video data via a digital data interface, the method including: receiving a video frame via the digital data interface; extracting three-dimensional (3D) video data from a video data period in the video frame; and extracting information regarding a 3D image format of the 3D video data from a data island period in the video frame.

The extracting the information regarding the 3D image format may include extracting information regarding a sub-sampling method for a top-and-bottom format from the data island period in the video frame.

The extracting the information regarding the 3D image format may include extracting at least one of the information regarding the 3D image format, the information regarding the sub-sampling method for the top-and-bottom format, and information representing whether the information regarding the 3D image format is inserted into the data island period, from a vendor-specific infoframe in the data island period.

Information regarding the top-and-bottom format may be extracted from a reserved period of a 3D video data field in the vendor-specific infoframe, and the information regarding the sub-sampling method for the top-and-bottom format may be extracted from a reserved period of an extended 3D video data field in the vendor-specific infoframe.

The method may further include extracting audio data and auxiliary data of the 3D video data from the data island period in the video frame, and the video frame may be the digital data to be received from a source device by a synchronization device.

According to an aspect of another exemplary embodiment, there is provided an apparatus for transmitting video data via a digital data interface, the apparatus including: a video data period insertion unit which inserts three-dimensional (3D) video data into a video data period in a video frame; a data island period insertion unit which inserts information regarding a 3D image format of the 3D video data into a data island period in the video frame; and a transmission unit which transmits the video frame via the digital data interface.

The video data transmission apparatus may be a source device.

According to an aspect of another exemplary embodiment, there is provided an apparatus for receiving video data via a digital data interface, the apparatus including: a reception unit which receives a video frame via the digital data interface; a video data period extraction unit which extracts three-dimensional (3D) video data from a video data period in the video frame; and a data island period extraction unit which extracts information regarding a 3D image format of the 3D video data from a data island period in the video frame.

The video data reception apparatus may be a synchronization device.

According to an aspect of another exemplary embodiment, there is provided a computer readable recording medium having recorded thereon a computer program for executing the video data transmission method.

According to an aspect of another exemplary embodiment, there is provided a computer readable recording medium having recorded thereon a computer program for executing the video data reception method.

BRIEF DESCRIPTION OF THE DRAWINGS

The above and/or other aspects will become more apparent by describing in detail exemplary embodiments thereof with reference to the attached drawings in which:

FIG. 3 is a diagram showing a video frame and transition minimized differential signaling (TMDS) periods, according to an exemplary embodiment;

FIG. 5 is a table showing packet type information in a packet header, according to an exemplary embodiment;

FIG. 7 is a structural diagram of a high definition multimedia interface (HDMI) video format data field in a vendor-specific infoframe, according to an exemplary embodiment;

FIG. 8 is a structural diagram of a three-dimensional (3D) video data field in a vendor-specific infoframe, according to an exemplary embodiment;

FIG. 9 is a structural diagram of an extended 3D video data field in a vendor-specific infoframe, according to an exemplary embodiment;

DETAILED DESCRIPTION OF EXEMPLARY EMBODIMENTS

Figure 1:
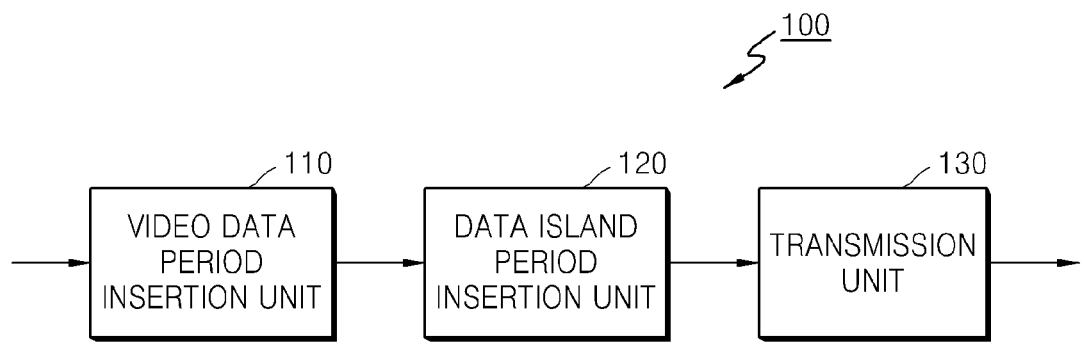
FIG. 1 is a block diagram of an apparatus for transmitting video data via a digital data interface, according to an exemplary embodiment.

Hereinafter, exemplary embodiments will be described in detail with reference to the attached drawings, in which like reference numerals refer to like elements throughout. Expressions such as "one of," when preceding a list of elements, modify the entire list of elements and do not modify the individual elements of the list.

FIG. 1 is a block diagram of an apparatus 100 for transmitting video data via a digital data interface, according to an exemplary embodiment. Referring to FIG. 1, the video data transmission apparatus 100 includes a video data period insertion unit 110, a data island period insertion unit 120, and a transmission unit 130. The video data transmission apparatus 100 generates video data having a data structure capable of being transmitted and received via a digital data interface, in order to transmit the video data via the digital data interface. If the digital data interface is capable of transmitting and receiving a transition minimized differential signaling (TMDS) signal, the video data may be processed in the form of a TMDS-based video frame.

The TMDS-based video frame includes a video data period, a data island period, and a control period, and includes video data, audio data, and auxiliary data. Pixel data of a video line may be transmitted in the video data period including a series of packets, and audio data and auxiliary data may be transmitted in the data island period. The data island period is formed at a horizontal blanking interval or a vertical blanking interval. The control period is formed between the video data period and the data island period.

The video data period insertion unit 110 inserts three-dimensional (3D) video data into the video data period in the video frame. Furthermore, the data island period insertion unit 120 inserts information regarding a 3D image format of the 3D video data as well as the audio data and the auxiliary data, into the data island period in the video frame.

In the 3D video data, left-view and right-view video data are mixed. The 3D image format represents a structure of a 3D image in which the left-view and right-view video data are aligned in one 3D image frame or field of the 3D video data. Examples of the 3D image format may include a side-by-side format, a top-and-bottom format, a horizontal line interleaved format, a vertical line interleaved format, a frame/field sequential format, a checker board format, etc.

In the side-by-side format, left-view and right-view images are respectively aligned in left and right regions of a 3D image. In the top-and-bottom format, left-view and right-view images are respectively aligned in top and bottom regions of a 3D image. In the horizontal line interleaved format, left-view and right-view images are respectively aligned in odd-numbered and even-numbered horizontal lines of the 3D image. In the vertical line interleaved format, left-view and right-view images are respectively aligned in odd-numbered and even-numbered vertical lines of the 3D image. In the frame/field sequential format, left-view and right-view images are respectively aligned in odd-numbered and even-numbered frames or fields of a frame/field sequence of the 3D image. In the checker board format, left-view and right-view images are alternately aligned in horizontal direction and vertical direction pixels of the 3D image. For convenience of description, the top-and-bottom format is hereinafter referred to as the 3D image format of the 3D video data, though it is understood that another exemplary embodiment is not limited thereto.

Also, the data island period insertion unit 120 further inserts information regarding a sub-sampling method for the 3D image format of the 3D video data, into the data island period. Left-view and right-view video data having halves of resolutions of original left-view and right-view images are respectively aligned in left-view and right-view video data regions of a 3D image in the 3D image format. For example, left-view and right-view data having halves of resolutions of left-view and right-view images of the 3D video data are respectively aligned in top and bottom regions of a 3D image in the top-and-bottom format.

Accordingly, sub-sampling may be performed on the original left-view or right-view image in order to reduce the resolution of the original left-view or right-view image by half. For example, the sub-sampling method for the top-and-bottom format may include: (i) a first sub-sampling method of respectively aligning left-view data formed of odd-numbered horizontal lines of a left-view image of the 3D video data and right-view data formed of odd-numbered horizontal lines of a right-view image of the 3D video data, in top and bottom regions of a 3D image in the top-and-bottom format; (ii) a second sub-sampling method of respectively aligning left-view data formed of odd-numbered horizontal lines of a left-view image of the 3D video data and right-view data formed of even-numbered horizontal lines of a right-view image of the 3D video data, in top and bottom regions of a 3D image in the top-and-bottom format; (iii) a third sub-sampling method of respectively aligning left-view data formed of even-numbered horizontal lines of a left-view image of the 3D video data and right-view data formed of odd-numbered horizontal lines of a right-view image of the 3D video data, in top and bottom regions of a 3D image in the top-and-bottom format; and (iv) a fourth sub-sampling method of respectively aligning left-view data formed of even-numbered horizontal lines of a left-view image of the 3D video data and right-view data formed of even-numbered horizontal lines of a right-view image of the 3D video data, in top and bottom regions of a 3D image in the top-and-bottom format.

Also, the data island period insertion unit 120 may further insert, into the data island period, information representing whether information regarding the 3D image format is inserted into the data island period. According to the information representing whether the information regarding the 3D image format is inserted into the data island period, a synchronization device may extract and use the information regarding the 3D image format from the data island period.

The data island period insertion unit 120 may insert the information regarding the 3D image format, the information regarding the sub-sampling method for the 3D image format, and the information representing whether the information regarding the 3D image format is inserted into the data island period, into an infoframe data packet in the data island period of the video frame. The data island period of the TMDS-based video frame includes a plurality of data packets, and the infoframe data packet is one of the plurality of data packets.

In more detail, the infoframe data packet includes a vendor-specific infoframe that is uniquely defined by each vendor. The data island period insertion unit 120 may insert the information regarding the 3D image format, the information regarding the sub-sampling method for the 3D image format, and the information representing whether the information regarding the 3D image format is inserted into the data island period, into the vendor-specific infoframe in the data island period.

In further detail, the data island period insertion unit 120 may insert the information regarding the 3D image format into a 3D video data field in the vendor-specific infoframe. For example, information regarding the top-and-bottom format from among 3D image formats may be inserted into a reserved period of the 3D video data field in the vendor-specific infoframe.

Also, the data island period insertion unit 120 may insert the information regarding the sub-sampling method for the 3D image format into an extended 3D video data field in the vendor-specific infoframe. For example, information regarding a sub-sampling method for the top-and-bottom format from among 3D image formats may be inserted into the reserved period of the extended 3D video data field in the vendor-specific infoframe.

Furthermore, the data island period insertion unit 120 may insert the information representing whether the information regarding the 3D image format is inserted into the data island period, into a high definition multimedia interface (HDMI) video format data field in the vendor-specific infoframe.

The transmission unit 130 transmits the video frame into which data is inserted by the video data period insertion unit 110 and the data island period insertion unit 120, via a digital data interface. Accordingly, the video data transmission apparatus 100 may generate video data having a data structure capable of being transmitted and received via a digital data interface based on a predetermined standard and into which information regarding 3D video data and a 3D image format is inserted.

Also, the video data transmission apparatus 100 may be a source device itself or may be mounted on the source device. Examples of a source device include a set top box, a digital versatile disc (DVD) player, a blu-ray disc (BD) player, etc. Accordingly, video data generated by the video data transmission apparatus 100 may be transmitted to a synchronization device via a digital data interface based on a predetermined standard.

Figure 2:
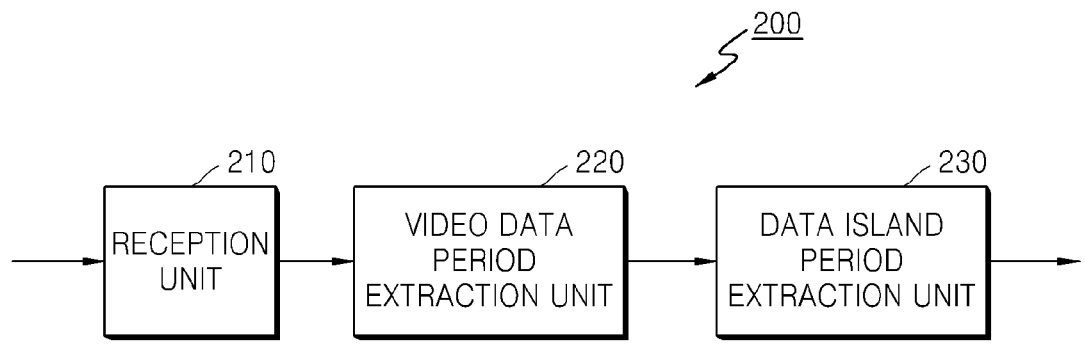
FIG. 2 is a block diagram of an apparatus for receiving video data via a digital data interface, according to an exemplary embodiment.

FIG. 2 is a block diagram of an apparatus 200 for receiving video data via a digital data interface, according to an exemplary embodiment. Referring to FIG. 2, the video data reception apparatus 200 includes a reception unit 210, a video data period extraction unit 220, and a data island period extraction unit 230.

The reception unit 210 receives video data via a digital data interface. The received video data may be in the form of a TMDS-based video frame. The video data period extraction unit 220 extracts 3D video data from a video data period in the video frame received by the reception unit 210.

Also, the data island period extraction unit 230 extracts information regarding a 3D image format of the 3D video data as well as audio data and auxiliary data, from a data island period in the video frame received by the reception unit 210. Furthermore, the data island period extraction unit 230 may further extract information regarding a sub-sampling method for the 3D image format, from the data island period in the video frame. The 3D image format of the 3D video data may include a top-and-bottom format, though it is understood that another exemplary embodiment is not limited thereto, as described above.

The data island period extraction unit 230 may extract the information regarding the 3D image format and the information regarding the sub-sampling method for the 3D image format, from a vendor-specific infoframe in the data island period. In more detail, the data island period extraction unit 230 may extract the information regarding the 3D image format from a 3D video data field in the vendor-specific infoframe, and may extract the information regarding the sub-sampling method for the 3D image format from an extended 3D video data field in the vendor-specific infoframe.

For example, the data island period extraction unit 230 may extract information regarding the top-and-bottom format from a reserved period of the 3D video data field in the vendor-specific infoframe, and may extract information regarding a sub-sampling method for the top-and-bottom format from a reserved period of the extended 3D video_data field in the vendor-specific infoframe.

Also, the data island period extraction unit 230 may extract information representing whether the information regarding the 3D image format is inserted into a corresponding infoframe packet of the video frame, from the vendor-specific infoframe in the data island period. For example, the information representing whether the information regarding the 3D image format is inserted into the infoframe packet of the video frame may be extracted from an HDMI video format data field in the vendor-specific infoframe.

The video data reception apparatus 200 may be a synchronization device itself, such as a 3D TV, a monitor, etc., or may be mounted on the synchronization device. The synchronization device may three-dimensionally reproduce restored 3D video data by using the information regarding the 3D image format. Also, the synchronization device may edit or store the restored 3D video data.

Accordingly, the video data reception apparatus 200 may receive video data having a data structure including the 3D video data and the information regarding the 3D image format, from a source device via a digital data interface based on a predetermined standard. Also, the video data reception apparatus 200 may restore 3D video data by decoding the received video data. The extracted information regarding the 3D image format is used to accurately and three-dimensionally reproduce the 3D video data. The restored 3D video data may be variously used, for example, may be reproduced, stored, or processed.

The video data transmission apparatus 100 illustrated in FIG. 1 and the video data reception apparatus 200 illustrated in FIG. 2 may respectively transmit and receive information regarding a 3D image format, information regarding a sub-sampling method, etc., by using extra space of video data capable of being transmitted and received via a digital data interface based on a predetermined standard such as an HDMI standard or a consumer electronics association (CEA) standard. Accordingly, an exemplary embodiment provides a 3D video service for transmitting and receiving related information of 3D video data while maintaining compatibility with existing devices adopting a digital data interface based on a predetermined standard.

FIG. 3 is a diagram showing a video frame 300 and transition minimized differential signaling (TMDS) periods, according to an exemplary embodiment. Referring to FIG. 3, an HDMI link operates in one of a video data period, a data island period, and a control period. In the video data period, active pixels of an active video line are transmitted. In the data island period, audio data and auxiliary data are transmitted in the form of a series of packets. The control period is used when there is no need to transmit the video data, the audio data, or the auxiliary data. The control period is formed between the video data period and the data island period.

The video frame 300 is transmitted in synchronization with a horizontal synchronization signal (HSYNC) pulse 310 and a vertical synchronization signal (VSYNC) pulse 320. The video frame 300 includes 525 horizontal lines, each including 850 pixels. The video data period in the video frame 300 corresponds to an active video region including 480 active lines 332 each including 720 active pixels 342.

In the video frame 300, 45 remaining horizontal lines 334 other than the active lines 332 correspond to a vertical blanking interval, and 138 pixels 344 other than the active pixels 342 in each of the horizontal lines correspond to a horizontal blanking interval.

Figure 4:
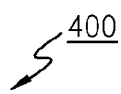
FIG. 4 is a structural diagram of a packet header in a data island period, according to an exemplary embodiment.

FIG. 4 is a structural diagram of a packet header 400 in a data island period, according to an exemplary embodiment. Referring to FIG. 4, the data island period includes a series of data island packets. The packet header 400 of the data island period includes packet type information and data bytes of packet-specific data.

FIG. 5 is a table showing packet type information 500 in a packet header, according to an exemplary embodiment. Referring to FIG. 5, the packet type information 500 in the packet header of the data island period defines various data island packet types according to packet type values. The data island packet types include a null packet, an audio clock regeneration packet, an audio sample packet, a general control packet, an audio content protection_(ACP) packet, an international standard recording code 1 (ISRC1) packet, an international standard recording code 2 (ISRC2) packet, a one bit audio sample packet, a direct stream transport (DST) audio packet, a high bitrate (HBR) audio stream packet, a gamut metadata packet, and an infoframe packet.

Also, the infoframe packet includes a vendor-specific infoframe 510, an auxiliary video information (AVI) infoframe, a source product descriptor infoframe, an audio infoframe, and an MPEG source infoframe.

A video data transmission apparatus 100 according to an exemplary embodiment may insert information regarding a 3D image format, information regarding a sub-sampling method for the 3D image format, and information representing whether the information regarding the 3D image format is inserted into the data island period, into the vendor-specific infoframe 510 of the infoframe packet in the packet header of the data island period.

Also, a data reception apparatus 200 according to an exemplary embodiment may extract the information regarding the 3D image format, the information regarding the sub-sampling method for the 3D image format, and the information representing whether the information regarding the 3D image format is inserted into the data island period, from the vendor-specific infoframe 510 of the infoframe packet in the packet header of the data island period.

Figure 6:
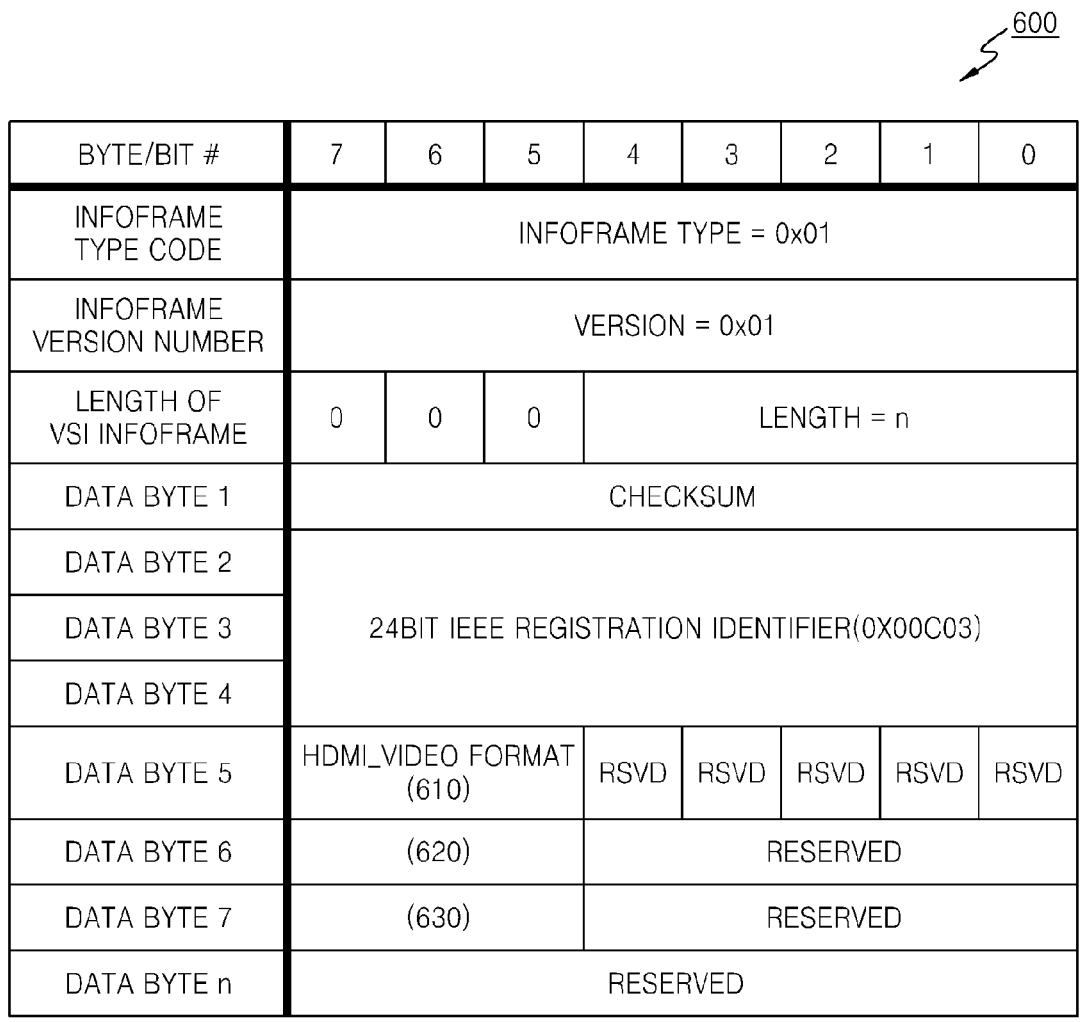
FIG. 6 is a structural diagram of a vendor-specific infoframe, according to an exemplary embodiment.

FIG. 6 is a structural diagram of a vendor-specific infoframe 600, according to an exemplary embodiment. Referring to FIG. 6, the vendor-specific infoframe 600 includes information regarding an infoframe type code, an infoframe version number, a length of a vendor-specific infoframe, and data bytes.

A video data transmission apparatus 100 according to an exemplary embodiment may respectively insert information representing whether information regarding a 3D image format is inserted into the data island period, the information regarding the 3D image format, and information regarding a sub-sampling method for the 3D image format, into a data field 610 of data byte 5, a data field 620 of data byte 6, and a data field 630 of data byte 7. The data field 610 may be referred to as an HDMI video format data field, the data field 620 may be referred to as a 3D video data field for information regarding structure of the 3D video data, and the data field 630 may be referred to as an extended 3D video data field for extended information regarding the 3D video data.

Also, a video data reception apparatus 200 according to an exemplary embodiment may respectively extract the information representing whether the information regarding the 3D image format is inserted into the data island period, the information regarding the 3D image format, and the information regarding the sub-sampling method for the 3D image format, from the data field 610 of data byte 5, the data field 620 of data byte 6, and the data field 630 of data byte 7.

FIG. 7 is a structural diagram of an HDMI video format data field 700 in a vendor-specific infoframe, according to an exemplary embodiment. Referring to FIG. 7, the HDMI video format data field 700 may have a value "000" representing that there is no additional video format in a corresponding infoframe, or a value "010" representing that information regarding a 3D image format is inserted into the corresponding infoframe.

That is, a video data transmission apparatus 100 according to an exemplary embodiment may insert information representing whether the information regarding the 3D image format is inserted into the infoframe, into the HDMI video format data field 700.

Also, a video data reception apparatus 200 according to an exemplary embodiment may extract the information representing whether the information regarding the 3D image format is inserted into the infoframe, from the HDMI video format data field 700.

FIG. 8 is a structural diagram of a 3D video data field 800 in a vendor-specific infoframe, according to an exemplary embodiment. Referring to FIG. 8, various types of information regarding 3D video data are allocated to values "0000" through "1000" of the 3D video data field 800. If values "1001" through "1111" of the 3D video data field 800 are allocated as a reserved period, a video data transmission apparatus 100 according to an exemplary embodiment may insert information representing a top-and-bottom format into the value "1001." Accordingly, the values "1010" through "1111" remain as the reserved period.

Also, a video data reception apparatus 200 according to an exemplary embodiment may extract the information representing the top-and-bottom format, from the reserved period of the 3D video data field 800.

FIG. 9 is a structural diagram of an extended 3D video data field 900 in a vendor-specific infoframe, according to an exemplary embodiment. Referring to FIG. 9, various types of information regarding extended 3D video data are allocated to values "0000" through "0111" of the extended 3D video_data field 900. If values "1000" through "1111" of the extended 3D video data field 900 are allocated as a reserved period, a video data transmission apparatus 100 according to an exemplary embodiment may insert information regarding a sub-sampling method for a top-and-bottom format into values "1000" through "1011." Accordingly, the values "1100" through "1111" remain as the reserved period.

For example, the information regarding the sub-sampling method for the top-and-bottom format may be set based on a vertical line sub-sampling method. Information representing a top-and-bottom format, in which left-view data obtained by sub-sampling odd-numbered pixels of a left-view image and right-view data obtained by sub-sampling odd-numbered pixels of a right-view image are respectively aligned in top and bottom regions of a 3D image, may be allocated to the value "1000" of the extended 3D video data field 900.

Likewise, information representing a top-and-bottom format, in which left-view data obtained by sub-sampling odd-numbered pixels of a left-view image and right-view data obtained by sub-sampling even-numbered pixels of a right-view image are respectively aligned in top and bottom regions of a 3D image, may be allocated to the value "1001" of the extended 3D video data field 900.

Also, information representing a top-and-bottom format, in which left-view data obtained by sub-sampling even-numbered pixels of a left-view image and right-view data obtained by sub-sampling odd-numbered pixels of a right-view image are respectively aligned in top and bottom regions of a 3D image, may be allocated to the value "1010" of the extended 3D video data field 900.

Likewise, information representing a top-and-bottom format, in which left-view data obtained by sub-sampling even-numbered pixels of a left-view image and right-view data obtained by sub-sampling even-numbered pixels of a right-view image are respectively aligned in top and bottom regions of a 3D image, may be allocated to the value "1011" of the extended 3D video data field 900.

Also, a video data reception apparatus 200 according to an exemplary embodiment may extract the information regarding the sub-sampling method for the top-and-bottom format, from the reserved period of the extended 3D video data field 900.

Figure 10A:
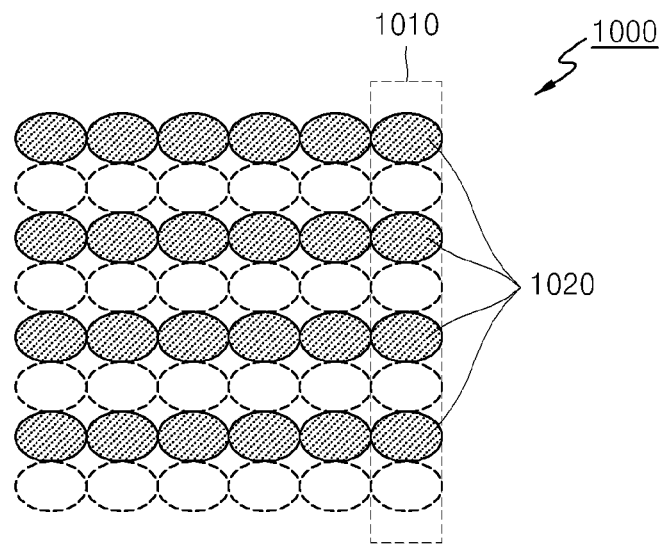
FIGS. 10A and 10B are diagrams for describing vertical line sub-sampling methods according to exemplary embodiments.
Figure 10B:
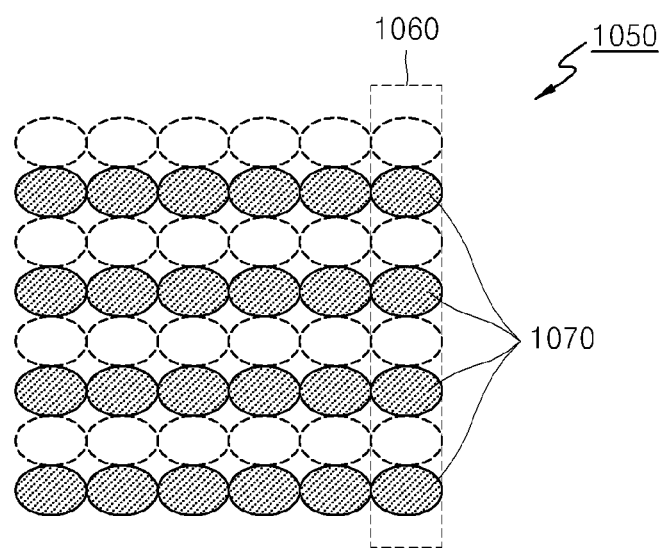

FIGS. 10A and 10B are diagrams for describing vertical line sub-sampling methods according to exemplary embodiments.

According to a vertical line sub-sampling method that is one of sub-sampling methods for a top-and-bottom format, which are described above in relation to FIG. 9, odd-numbered pixels 1020 or even-numbered pixels 1070 of one vertical line 1010 or 1060 of a left-view or right-view image 1000 or 1050 are sub-sampled.

Accordingly, as illustrated in FIG. 10A, if the odd-numbered pixels 1020 of all vertical lines 1010 of the left-view or right-view image 1000 are sub-sampled, only odd-numbered horizontal lines of the left-view or right-view image 1000 may be aligned in a 3D image in a top-and-bottom format. Likewise, as illustrated in FIG. 10B, if the even-numbered pixels 1070 of all vertical lines 1060 of the left-view or right-view image 1050 are sub-sampled, only even-numbered horizontal lines of the left-view or right-view image 1050 may be aligned in a 3D image in a top-and-bottom format.

According to a first sub-sampling method of selecting odd-numbered pixels of a left-view image and odd-numbered pixels of a right-view image, which is allocated to the value "1000" of the extended 3D video data field 900 illustrated in FIG. 9, left-view data obtained by extracting odd-numbered horizontal lines of a left-view image of 3D video data and right-view data obtained by extracting odd-numbered horizontal lines of a right-view image of the 3D video data are aligned in top and bottom regions of a 3D image in a top-and-bottom format.

Likewise, according to a second sub-sampling method of selecting odd-numbered pixels of a left-view image and even-numbered pixels of a right-view image, which is allocated to the value "1001" of the extended 3D video data field 900 illustrated in FIG. 9, left-view data obtained by extracting odd-numbered horizontal lines of a left-view image of 3D video data and right-view data obtained by extracting even-numbered horizontal lines of a right-view image of the 3D video data are aligned in top and bottom regions of a 3D image in a top-and-bottom format.

Also, according to a third sub-sampling method of selecting even-numbered pixels of a left-view image and odd-numbered pixels of a right-view image, which is allocated to the value "1010" of the extended 3D video data field 900 illustrated in FIG. 9, left-view data obtained by extracting even-numbered horizontal lines of a left-view image of 3D video data and right-view data obtained by extracting odd-numbered horizontal lines of a right-view image of the 3D video data are aligned in top and bottom regions of a 3D image in a top-and-bottom format.

Likewise, according to a fourth sub-sampling method of selecting even-numbered pixels of a left-view image and even-numbered pixels of a right-view image, which is allocated to the value "1011" of the extended 3D video data field 900 illustrated in FIG. 9, left-view data obtained by extracting even-numbered horizontal lines of a left-view image of 3D video data and right-view data obtained by extracting even-numbered horizontal lines of a right-view image of the 3D video data are aligned in top and bottom regions of a 3D image in a top-and-bottom format.

Accordingly, a video data transmission apparatus 100 according to an exemplary embodiment and a video data reception apparatus 200 according to an exemplary embodiment may respectively transmit and receive uncompressed 3D video data, information regarding a 3D image format, and related information regarding the 3D video via a digital data interface by using a video frame such as described above with reference to FIGS. 6 through 10.

Figure 11:
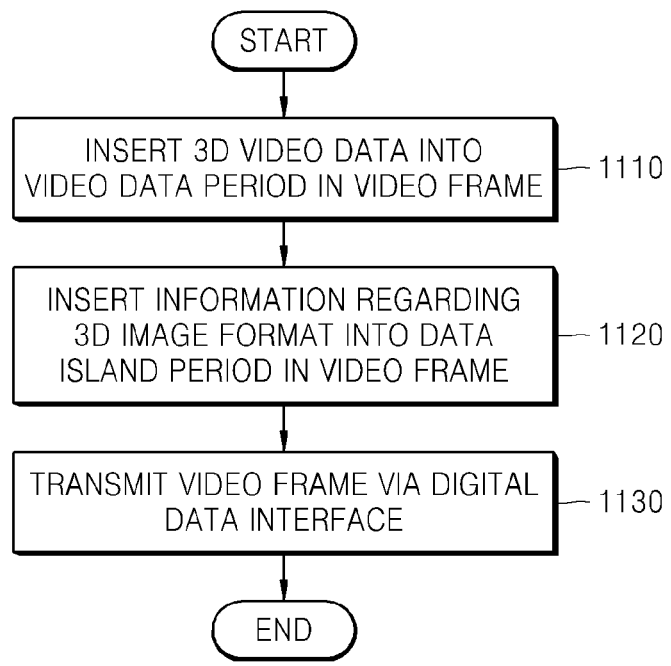
FIG. 11 is a flowchart of a method of transmitting video data via a digital data interface, according to an exemplary embodiment.

FIG. 11 is a flowchart of a method of transmitting video data via a digital data interface, according to an exemplary embodiment. Referring to FIG. 11, in operation 1110, 3D video data is inserted into a video data period in a video frame. The video frame has a data structure capable of being transmitted and received via a digital data interface based on a predetermined standard. The video frame includes the video data period, a data island period, and a control period.

In operation 1120, information regarding a 3D image format of the 3D video data may be inserted into the data island period in the video frame. The information regarding the 3D image format may be inserted into a 3D video data field of a vendor-specific infoframe in an infoframe packet of the data island period. For example, information regarding a top-and-bottom format may be inserted into a reserved period of the 3D video data field in the vendor-specific infoframe, though it is understood that another exemplary embodiment is not limited to the top-and-bottom format.

Also, information regarding a sub-sampling method for the 3D image format in which left-view and right-view data having halves of resolutions of original left-view and right-view images may be inserted into an extended 3D video data field of the vendor-specific infoframe in the infoframe packet of the data island period. For example, information regarding a sub-sampling method for the top-and-bottom format may be inserted into a reserved period of the extended 3D video data field in the vendor-specific infoframe.

Also, information representing whether the information regarding the 3D image format is inserted into the infoframe packet may be inserted into an HDMI video format data field of the vendor-specific infoframe in the infoframe packet of the data island period.

In operation 1130, the video frame into which the information regarding the 3D image format and its related information are inserted is transmitted to a synchronization device via a digital data interface.

Figure 12:
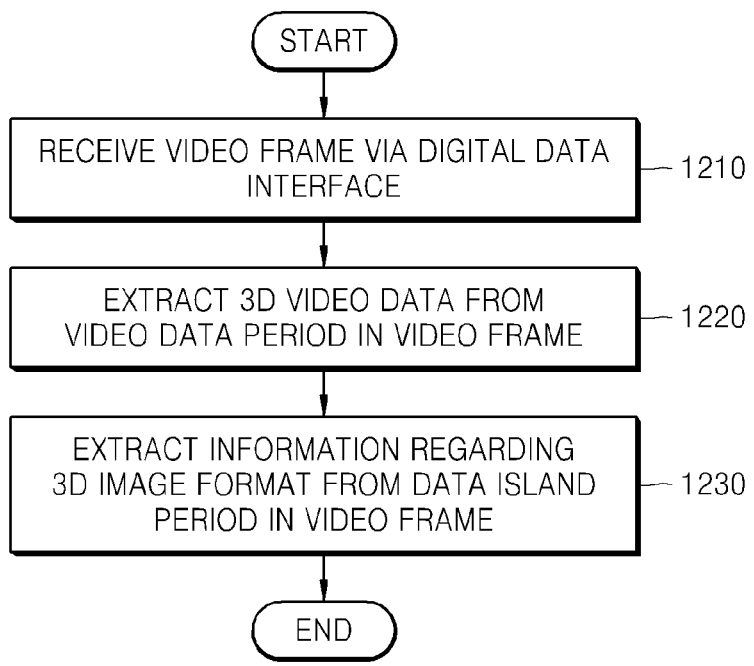
FIG. 12 is a flowchart of a method of receiving video data via a digital data interface, according to an exemplary embodiment.

FIG. 12 is a flowchart of a method of receiving video data via a digital data interface, according to an exemplary embodiment. Referring to FIG. 12, in operation 1210, a video frame is received via a digital data interface. The video frame received via a digital data interface based on a predetermined standard includes a video data period into which video data is inserted, a data island period into which audio data and auxiliary data are inserted, and a control period. The predetermined standard may be a digital data interface standard for allowing TMDS-based signaling, such as an HDMI standard or a CEA standard.

In operation 1220, 3D video data is extracted from the video data period in the video frame. The 3D video data follows a 3D image format in which corresponding left-view and right-view data are aligned according to a predetermined rule. Information regarding the 3D image format is used to restore left-view and right-view images from the 3D video data and to accurately and three-dimensionally reproduce the 3D video data.

In operation 1230, information regarding the 3D image format of the 3D video data is extracted from the data island period in the video frame. The information regarding the 3D image format may be extracted from a 3D video data field of a vendor-specific infoframe in an infoframe packet of the data island period. For example, information regarding a top-and-bottom format may be extracted from a reserved period of the 3D video data field in the vendor-specific infoframe, though it is understood that another exemplary embodiment is not limited to the top-and-bottom format.

Also, information regarding a sub-sampling method for the 3D image format may be extracted from an extended 3D video data field of the vendor-specific infoframe in the infoframe packet of the data island period. For example, information regarding a sub-sampling method for the top-and-bottom format may be extracted from a reserved period of the extended 3D video data field in the vendor-specific infoframe.

Also, information representing whether the information regarding the 3D image format is inserted into the infoframe packet may be extracted from an HDMI video format data field of the vendor-specific infoframe in the infoframe packet of the data island period.

The restored left-view and right-view images of the 3D video data may be three-dimensionally reproduced or stored by a synchronization device. Accordingly, the video data transmission method illustrated in FIG. 11 and the video data reception method illustrated in FIG. 12 may respectively transmit and receive a video frame, into which uncompressed 3D video data is inserted, together with information regarding a 3D image format and its related information, via a digital data interface based on an existing predetermined standard, in order to accurately and three-dimensionally reproduce the 3D video data.

Meanwhile, an exemplary embodiment can be written as a computer program and can be implemented in a general-use digital computer that executes the program using a computer readable recording medium. Examples of the computer readable recording medium include magnetic storage media (e.g., ROM, floppy disks, hard disks, etc.), optical recording media (e.g., CD-ROMs, or DVDs), etc.

While exemplary embodiments have been particularly shown and described with reference to the drawings, it will be understood by one of ordinary skill in the art that various changes in form and details may be made therein without departing from the spirit and scope of the inventive concept as defined by the following claims. The exemplary embodiments should be considered in a descriptive sense only and not for purposes of limitation. Therefore, the scope of the inventive concept is defined not by the detailed description of the exemplary embodiments, but by the following claims, and all differences within the scope will be construed as being included in the present inventive concept.

What is claimed is:

1. A method of transmitting video data via a digital data interface, the method comprising:
   inserting three-dimensional (3D) video data into a video data period in a video frame;
   inserting information regarding a 3D image format of the 3D video data into a data island period in the video frame;
   inserting information indicating whether the information regarding the 3D image format is inserted into the data island period, the information indicating whether the information regarding the 3D image format is inserted into the data island period, comprising a first value indicating that there is no additional video format and a second value indicating that the information regarding the 3D image format is inserted; and transmitting the video frame via the digital data interface,
wherein the 3D image format represents a structure of left-view data and right-view data of the 3D video data aligned in one 3D image,
wherein the 3D image format of the 3D video data comprises a top-and-bottom format,
wherein the inserting the information regarding the 3D image format comprises inserting information regarding a sub-sampling method for the top-and-bottom format into the data island period in the video frame,
the sub-sampling method for the top-and-bottom format is a sub-sampling method of respectively aligning the left-view data and the right-view data having halves of resolutions of a left-view image and a right-view image of the 3D video data, in a top region and a bottom region of a 3D image in the top-and-bottom format,
wherein information regarding the top-and-bottom format is inserted into a reserved period of a 3D video data field in a vendor-specific infoframe in the data island period, and
the information regarding the sub-sampling method for the top-and-bottom format is inserted into a reserved period of an extended 3D video data field in the vendor-specific infoframe.

2. The method of claim 1, wherein the inserting the information regarding the 3D image format comprises inserting the information regarding the 3D image format into a vendor-specific infoframe in the data island period.

3. The method of claim 1, wherein the inserting the information regarding the sub-sampling method for the top-and-bottom format comprises inserting the information regarding the sub-sampling method for the top-and-bottom format into a vendor-specific infoframe in the data island period.

4. The method of claim 1, wherein the inserting the information indicating whether the information regarding the 3D image format is inserted into the data island period, comprises inserting the information indicating whether the information regarding the 3D image format is inserted into the data island period, into a vendor-specific infoframe.

5. The method of claim 1, wherein the sub-sampling method for the top-and-bottom format is one of:
a first sub-sampling method of respectively aligning the left-view data comprising odd-numbered horizontal lines of the left-view image of the 3D video data and the right-view data comprising odd-numbered horizontal lines of the right-view image of the 3D video data, in the top and the bottom regions of the 3D image in the top-and-bottom format;
a second sub-sampling method of respectively aligning the left-view data comprising the odd-numbered horizontal lines of the left-view image of the 3D video data and the right-view data comprising even-numbered horizontal lines of the right-view image of the 3D video data, in the top and the bottom regions of the 3D image in the top-and-bottom format;
a third sub-sampling method of respectively aligning the left-view data comprising even-numbered horizontal lines of the left-view image of the 3D video data and the right-view data comprising the odd-numbered horizontal lines of the right-view image of the 3D video data, in the top and the bottom regions of the 3D image in the top-and-bottom format; and
a fourth sub-sampling method of respectively aligning the left-view data comprising the even-numbered horizontal lines of the left-view image of the 3D video data and the right-view data comprising the even-numbered horizontal lines of the right-view image of the 3D video data, in the top and the bottom regions of the 3D image in the top-and-bottom format.

6. The method of claim 1, further comprising:
inserting audio data and auxiliary data of the 3D video data into the data island period in the video frame,
wherein the video frame is digital data to be transmitted from a source device to a synchronization device, the video frame is a transition minimized differential signaling (TMDS)-based signal, and the video frame comprises a control period between the video data period and the data island period.

7. The method of claim 1, wherein the 3D image format of the 3D video data is one of a side-by-side format, a top-and-bottom format, a horizontal line interleaved format, a vertical line interleaved format, a frame/field sequential format, and a checker board format.

8. The method of claim 1, wherein:
the inserting the information regarding the 3D image format comprises inserting information regarding a sub-sampling method for the 3D image format into the data island period in the video frame; and
the sub-sampling method for the 3D image format is a sub-sampling method of respectively aligning the left-view data and the right-view data having halves of resolutions of a left-view image and a right-view image of the 3D video data, in a 3D image of the 3D image format.

9. The method of claim 8, wherein the inserting the information regarding the sub-sampling method for the 3D image format comprises inserting the information regarding the sub-sampling method for the 3D image format into a vendor-specific infoframe in the data island period.

10. The method of claim 8, wherein:
information regarding the 3D image format is inserted into a reserved period of a 3D video data field in a vendor-specific infoframe in the data island period; and
the information regarding the sub-sampling method for the 3D image format is inserted into a reserved period of an extended 3D video data field in the vendor-specific infoframe.

11. The method of claim 1, wherein the video frame is a TMDS-based signal.

12. The method of claim 1, wherein the video frame comprises a control period between the video data period and the data island period, and the data island period is at a blanking interval of the video frame in which no active lines having active pixels are included.

13. A method of receiving video data via a digital data interface, the method comprising:
receiving a video frame via the digital data interface;
extracting three-dimensional (3D) video data from a video data period in the video frame;
extracting information regarding a 3D image format of the 3D video data from a data island period in the video frame; and
extracting information indicating whether the information regarding the 3D image format is inserted into the data island period, the information indicating whether the information regarding the 3D image format is inserted into the data island period, comprising a first value indicating that there is no additional video format and a second value indicating that the information regarding the 3D image format is inserted,
wherein the 3D image format represents a structure of left-view data and right-view data of the 3D video data aligned in one 3D image, wherein the 3D image format of the 3D video data comprises a top-and-bottom format, wherein the extracting the information regarding the 3D image format comprises extracting information regarding a sub-sampling method for the top-and-bottom format from the data island period in the video frame, the sub-sampling method for the top-and-bottom format is a sub-sampling method of respectively aligning the left-view data and the right-view data having halves of resolutions of a left-view image and a right-view image of the 3D video data, in a top region and a bottom region of a 3D image in the top-and-bottom format, wherein information regarding the top-and-bottom format is extracted from a reserved period of a 3D video data field in a vendor-specific infoframe in the data island period, and the information regarding the sub-sampling method for the top-and-bottom format is extracted from a reserved period of an extended 3D video data field in the vendor-specific infoframe.

14. The method of claim 13, wherein the extracting the information regarding the 3D image format comprises extracting the information regarding the 3D image format from a vendor-specific infoframe in the data island period.

15. The method of claim 13, wherein the extracting the information regarding the sub-sampling method for the top-and-bottom format comprises extracting the information regarding the sub-sampling method for the top-and-bottom format from a vendor-specific infoframe in the data island period.

16. The method of claim 13, wherein the extracting the information indicating whether the information regarding the 3D image format is inserted into the data island period, comprises extracting the information indicating whether the information regarding the 3D image format is inserted into the data island period, from the vendor-specific infoframe.

17. The method of claim 13, wherein the sub-sampling method for the top-and-bottom format is one of:
a first sub-sampling method of respectively aligning the left-view data comprising odd-numbered horizontal lines of the left-view image of the 3D video data and the right-view data comprising odd-numbered horizontal lines of the right-view image of the 3D video data, in the top and the bottom regions of the 3D image in the top-and-bottom format;
a second sub-sampling method of respectively aligning the left-view data comprising the odd-numbered horizontal lines of the left-view image of the 3D video data and the right-view data comprising even-numbered horizontal lines of the right-view image of the 3D video data, in the top and the bottom regions of the 3D image in the top-and-bottom format;
a third sub-sampling method of respectively aligning the left-view data comprising even-numbered horizontal lines of the left-view image of the 3D video data and the right-view data comprising the odd-numbered horizontal lines of the right-view image of the 3D video data, in the top and the bottom regions of the 3D image in the top-and-bottom format; and
a fourth sub-sampling method of respectively aligning the left-view data comprising the even-numbered horizontal lines of the left-view image of the 3D video data and the right-view data comprising the even-numbered horizontal lines of the right-view image of the 3D video data, in the top and the bottom regions of the 3D image in the top-and-bottom format.

18. The method of claim 13, further comprising:
extracting audio data and auxiliary data of the 3D video data from the data island period in the video frame,
wherein the video frame is digital data to be received from a source device by a synchronization device, is a transition minimized differential signaling (TMDS)-based signal, and comprises a control period between the video data period and the data island period.

19. The method of claim 13, further comprising three-dimensionally reproducing the 3D video data using the extracted information regarding the 3D image format.

20. The method of claim 13, wherein:
the extracting the information regarding the 3D image format comprises extracting information regarding a sub-sampling method for the 3D image format from the data island period in the video frame; and
the sub-sampling method for the 3D image format is a sub-sampling method of respectively aligning the left-view data and the right-view data having halves of resolutions of a left-view image and a right-view image of the 3D video data, in a 3D image of the 3D image format.

21. An apparatus for transmitting video data via a digital data interface, the apparatus comprising:
a video data period insertion unit which inserts three-dimensional (3D) video data into a video data period in a video frame;
a data island period insertion unit which inserts information regarding a 3D image format of the 3D video data and information indicating whether the information regarding the 3D image format is inserted into a data island period into the data island period in the video frame; and
a transmission unit which transmits the video frame via the digital data interface,
wherein the 3D image format represents a structure of left-view data and right-view data of the 3D video data aligned in one 3D image,
wherein the 3D image format of the 3D video data comprises a top-and-bottom format,
wherein the data island period insertion unit inserts the information regarding the 3D image format and the data island period insertion unit inserts information regarding a sub-sampling method for the top-and-bottom format into the data island period in the video frame,
the sub-sampling method for the top-and-bottom format is a sub-sampling method of respectively aligning the left-view data and the right-view data having halves of resolutions of a left-view image and a right-view image of the 3D video data, in a top region and a bottom region of a 3D image in the top-and-bottom format,
wherein information regarding the top-and-bottom format is inserted into a reserved period of a 3D video data field in a vendor-specific infoframe in the data island period, and
the information regarding the sub-sampling method for the top-and-bottom format is inserted into a reserved period of an extended 3D video data field in the vendor-specific infoframe.

22. The apparatus of claim 21, wherein the apparatus is a source device.

23. An apparatus for receiving video data via a digital data interface, the apparatus comprising:
a reception unit which receives a video frame via the digital data interface;
a video data period extraction unit which extracts three-dimensional (3D) video data from a video data period in the video frame; and a data island period extraction unit which extracts information regarding a 3D image format of the 3D video data and information indicating whether the information regarding the 3D image format is inserted into a data island period from the data island period in the video frame, wherein the 3D image format represents a structure of left-view data and right-view data of the 3D video data aligned in one 3D image, wherein the 3D image format of the 3D video data comprises a top-and-bottom format, wherein the data island period extraction unit extracts the information regarding the 3D image format and the data island period extraction unit extracts information regarding a sub-sampling method for the top-and-bottom format from the data island period in the extracting the information regarding the 3D image format, the data island period extraction unit extracts information regarding a sub-sampling method for the top-and-bottom format from the data island period in the video frame, the sub-sampling method for the top-and-bottom format is a sub-sampling method of respectively aligning the left-view data and the right-view data having halves of resolutions of a left-view image and a right-view image of the 3D video data, in a top region and a bottom region of a 3D image in the top-and-bottom format, wherein information regarding the top-and-bottom format is extracted from a reserved period of a 3D video data field in a vendor-specific infoframe in the data island period, and the information regarding the sub-sampling method for the top-and-bottom format is extracted from a reserved period of an extended 3D video data field in the vendor-specific infoframe.

24. The apparatus of claim 23, wherein the apparatus is a synchronization device.

25. A non-transitory computer readable recording medium having recorded thereon a computer program for executing the method of claim 1.

26. A non-transitory computer readable recording medium having recorded thereon a computer program for executing the method of claim 13.

* * * * *